(12) United States Patent
Sun et al.

(10) Patent No.: US 12,048,341 B2
(45) Date of Patent: Jul. 30, 2024

(54) AROMATIC MICROCAPSULE, AROMATIC CHEMICAL FIBER FALSE EYELASHES AND PREPARATION METHODS THEREOF

(71) Applicant: QINGDAO KELLY LASH COSMETIC CO., LTD, Qingdao (CN)

(72) Inventors: Simin Sun, Qingdao (CN); Qingzeng Sun, Qingdao (CN)

(73) Assignee: QINGDAO KELLY LASH COSMETIC CO., LTD, Qingdao (CN)

( * ) Notice: Subject to any disclaimer, the term of this patent is extended or adjusted under 35 U.S.C. 154(b) by 0 days.

(21) Appl. No.: 18/491,432

(22) Filed: Oct. 20, 2023

(65) Prior Publication Data
US 2024/0041145 A1    Feb. 8, 2024

Related U.S. Application Data

(63) Continuation of application No. PCT/CN2023/115256, filed on Aug. 28, 2023.

(30) Foreign Application Priority Data

Apr. 14, 2023 (CN) .......................... 202310397770.3

(51) Int. Cl.
| | |
|---|---|
| *A41G 5/02* | (2006.01) |
| *B01J 13/02* | (2006.01) |
| *C08K 3/22* | (2006.01) |
| *C08K 9/10* | (2006.01) |
| *D06M 13/00* | (2006.01) |

(52) U.S. Cl.
CPC ................ *A41G 5/02* (2013.01); *B01J 13/02* (2013.01); *C08K 3/22* (2013.01); *C08K 9/10* (2013.01); *D06M 13/005* (2013.01); *C08K 2201/007* (2013.01)

(58) Field of Classification Search
CPC ......... D06M 13/005; B01J 13/02; A41G 5/02; C08K 3/22; C08K 9/10; C08K 2201/007
USPC ........................................................... 512/4, 1
See application file for complete search history.

(56) References Cited

FOREIGN PATENT DOCUMENTS

| | | | |
|---|---|---|---|
| CN | 104907022 A | * | 9/2015 |
| CN | 104907022 A | | 9/2015 |
| CN | 110747650 A | | 2/2020 |
| CN | 115279485 A | | 11/2022 |
| KR | 20100048694 A | | 5/2010 |

OTHER PUBLICATIONS

Wang et al, CN 104907022 Machine Translation, Sep. 16, 2015 (Year: 2015).*

* cited by examiner

*Primary Examiner* — Jessica Whiteley

(57) ABSTRACT

An aromatic microcapsule, aromatic chemical fiber false eyelashes and preparation methods thereof. The preparation of the aromatic chemical fiber false eyelashes includes preparation of the aromatic microcapsule including preparation of a wall material solution and a core material solution including a niobate. The core material solution further contains a silane coupling agent and an essential oil or fragrance, where a mass ratio of the essential oil or fragrance to the silane coupling agent to the niobate is (1-3):(1-3):(0.5-1), and the niobate is $KNa_2[Nb_{24}O_{72}H_{21}]\cdot 38H_2O$.

9 Claims, 4 Drawing Sheets

AROMATIC MICROCAPSULE, AROMATIC CHEMICAL FIBER FALSE EYELASHES AND PREPARATION METHODS THEREOF

CROSS-REFERENCE TO RELATED APPLICATIONS

This application is a continuation of International Patent Application No. PCT/CN2023/115256, filed on Aug. 28, 2023, which claims the benefit of priority from Chinese Patent Application No. 202310397770.3, filed on Apr. 14, 2023. The content of the aforementioned application, including any amendments made thereto, is incorporated herein by reference in its entirety.

TECHNICAL FIELD

This application relates to cosmetics, and more particularly to an aromatic microcapsule, aromatic chemical fiber false eyelashes and preparation methods thereof.

BACKGROUND

With the rapid economic development of various countries, people's aesthetics are becoming more and more diversified and refined. False eyelashes are widely used in a beauty industry and are deeply loved by consumers. In a field of false eyelashes, the false eyelashes can be divided into real hair false eyelashes and artificial fiber false eyelashes. The real hair false eyelashes are generally made of natural hairs, such as mink hairs; while artificial fiber false eyelashes are generally made from chemical fibers.

The artificial false eyelashes are the most widely used at present, mainly because compared with the real hair false eyelashes, chemical fiber false eyelashes have low cost and simple production process. However, the chemical fiber false eyelashes may produce odor in high temperature environments, causing discomfort to consumers.

A general method to eliminate the unpleasant odor of the chemical fiber false eyelashes is to apply or bind aromatic substances to the false eyelashes. However, due to the volatility of aromatic essential oils, the aroma is not very durable when combined with the false eyelashes. A wearing time of false eyelashes on the market is generally 1-2 months, and even consumers have a demand for longer wearing time of false eyelashes. Therefore, the current aromatic microcapsule technology is not suitable for needs of false eyelashes worn for a long time.

Chinese Patent No. 110747650B, titled "Moisture-wicking aromatic chemical fiber wig finishing process", disclosed aromatic chemical fiber wigs, in which a microcapsule made of chitosan as a core material and gelatin as a wall material can achieve the slow and sustained release of chitosan, giving the wigs an antibacterial effect for a long time. Microencapsulated fragrances made of an aromatic essential oil, gelatin and an emulsifier can slowly release the aromatic essential oil for a long time, which can effectively solve the problem of sour smell of wigs after long-term wearing and enhance the practicality of wigs. However, it has been found that this technology is not very effective in retaining the fragrance of chemical fiber false eyelashes.

SUMMARY

An object of the disclosure is to provide aromatic chemical fiber false eyelashes with sustained fragrance release to overcome the technical defects existing in the prior art.

It has been found in the development of multi-scenario applications of niobate materials that the niobate not only has good effects in traditional applications such as photocatalysis, but also can play a role in encapsulating some specific components in a specific structure. It was found that $KNa_2[Nb_{24}O_{72}H_{21}]\cdot 38H_2O$ can be used as a core component in the fragrance encapsulation of chemical fiber false eyelashes to achieve the long-lasting fragrance retention and long service life. Based on this, aromatic chemical fiber false eyelashes and a preparation method thereof are provided herein.

In a first aspect, the disclosure provides an aromatic chemical fiber false eyelash, comprising:
  a false eyelash body; and
  an aromatic microcapsule attached to the false eyelash body;
  wherein the aromatic microcapsule comprises a wall material and a core material;
  the core material comprises a niobate, and an essential oil or fragrance; wherein the niobate is $KNa_2[Nb_{24}O_{72}H_{21}]\cdot 38H_2O$; and the essential oil is selected from the group consisting of a chamomile essential oil, a jasmine essential oil, a ylang-ylang essential oil and a combination thereof; the fragrance is selected from the group consisting of a mint fragrance, a grape fragrance, a lavender fragrance, an international fragrance, a tea polyphenol fragrance, a Chanel fragrance and a combination thereof, or mixed with flavors or fragrances which are sleep-friendly.

It should be noted that the shape and structure of the aromatic chemical fiber false eyelash are not specifically limited herein, for example, it can be single lash extension, segmented false eyelash, DIY lash extension, segmented DIY lash extension, eyelash extension and pre-made fan lash extension.

In a second aspect, the disclosure provides a method of preparing aromatic chemical fiber false eyelashes, comprising:
  preparing an aromatic microcapsule;
  wherein the step "preparing an aromatic microcapsule" comprises:
  preparing a wall material solution; and
  preparing a core material solution;
  wherein the core material solution comprises a niobate; and the niobate is $KNa_2[Nb_{24}O_{72}H_{21}]\cdot 38H_2O$ in some embodiments.

In some embodiments, the wall material solution comprises a β-cyclodextrin and deionized water, preferably in a mass ratio of 1:9, which can be adjusted according to an actual solution dosage.

In some embodiments, the core material solution comprises an essential oil or fragrance, a silane coupling agent and a niobate, preferably in a mass ratio of (1-3):(1-3):(0.5-1), and more preferably in a mass ratio of (1-2):(1-2): 0.5. In an embodiment, the mass ratio is 1:1:0.5.

In some embodiments, a mass ratio of the core material solution to the wall material solution is preferably 1:4, which can be adjusted according to an actual solution dosage.

In some embodiments, the essential oil or fragrance is selected from the group consisting of a chamomile essential oil, a jasmine essential oil, a ylang-ylang essential oil, a milk fragrance, a jasmine fragrance, a mugwort fragrance, a chamomile fragrance, a mint fragrance, a grape fragrance, a lavender fragrance, an international fragrance, a tea polyphenol fragrance, a Chanel fragrance and a combination thereof, or mixed with flavors or fragrances helping sleep.

The method of preparing aromatic chemical fiber false eyelashes further comprises:
  mixing the aromatic microcapsule with an adhesive to prepare a finishing solution.

Specifically, the disclosure provides a method of preparing aromatic chemical fiber false eyelashes, comprising:
  step (1) washing false eyelashes with ethanol;
  step (2) dissolving β-cyclodextrin in deionized water followed by stirring at room temperature for 12 h to obtain the wall material solution in a saturated state;
  step (3) dissolving the essential oil or fragrance, the silane coupling agent and the niobate in ethanol followed by stirring at room temperature for 12 h to obtain the core material solution;
  step (4) slowly pouring the core material solution obtained in step (3) into the wall material solution followed by stirring at a uniform speed to obtain a mixed solution;
  step (5) dispersing and shearing the mixed solution with a shearing machine at a speed of 3000-5000 r/min for 10-20 min to obtain an aromatic microcapsule emulsion;
  step (6) adding 10-20 g/L of an adhesive to the aromatic microcapsule emulsion prepared in step (5) to obtain a mixed finishing solution; and
  step (7) drying the false eyelashes; and immersing the false eyelashes in the mixed finishing solution for 10-20 min followed by pre-curing and curing in sequence to obtain the aromatic chemical fiber false eyelashes.

In some embodiments, in step (3), a mass ratio of the essential oil to the silane coupling agent to the niobate to the ethanol is (1-3):(1-3):(0.5-1): 50, more preferably (1-2):(1-2): 0.5:50, and more preferably 1:1:0.5:50.

In some embodiments, in step (4), a mass ratio of the core material solution to the wall material solution is 1:4.

In some embodiments, in step (6), the adhesive is the adhesive NS-19B produced by Suzhou Liansheng Chemistry Co., Ltd., and an added amount of the adhesive is preferably 10-20 g/L of the aromatic microcapsule emulsion.

In some embodiments, in step (7), a temperature of the pre-curing is 90-110° C., and a lasting time of the pre-curing is 2-3 min.

In some embodiments, in step (7), a temperature of the curing is 130-150° C., and a lasting time of the curing is 30-60 s.

In a third aspect, the disclosure provides an aromatic microcapsule. The aromatic microcapsule can be used for lasting fragrance retention of chemical fiber false eyelashes. The aromatic microcapsule can be made of poly butylene terephthalate (PBT) material, polyethylene terephthalate (PET) material, or a PBT-PET mixed chemical fiber material, or other types of chemical fiber false eyelashes. The aromatic microcapsule comprises a wall material and a core material; the core material comprises a niobate; and the niobate is preferably $KNa_2[Nb_{24}O_{72}H_{21}]·38H_2O$. The aromatic microcapsule can be present and preserved in a form of emulsions.

In a fourth aspect, the disclosure provides a method of preparing an aromatic microcapsule, comprising:
  preparing a wall material solution; and
  preparing a core material solution;
    wherein the core material solution comprises a niobate; and the niobate is preferably $KNa_2[Nb_{24}O_{72}H_{21}]·38H_2O$.

This application has the following beneficial effects.

The fiber aromatic false eyelashes of the disclosure adopt a microcapsule technology with the niobate added to the core material of the microcapsule, which can effectively protect volatile and easily denatured substances in the essential oil from an influence of the external environment and the substances are wrapped inside to make them less likely to agglomerate and stick to walls. Meanwhile, this promotes a slow release of the aromatic microcapsule, so that the chemical fiber false eyelashes can be used repeatedly and have an increased service life. This effect may mainly come from a special three-dimensional structure of the niobate. For example, an anion of the niobate is composed of three seven-niobium oxygen clusters connected by three niobium-oxygen octahedrons to form a triangular structure, thus forming a three-dimensional network structure through potassium ions and sodium ions, thereby forming a large number of cavities.

Compared with other conventional methods, the method described herein for preparing aromatic false eyelashes has simple operation, low cost, and good fragrance retention effect, and is more suitable for large-scale production.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Drawings forming a part of this application are intended to provide further understanding of the present disclosure, and exemplary embodiments and descriptions thereof are intended to explain this application and are not intended to limit the scope of this application.

DETAILED DESCRIPTION OF EMBODIMENTS

This application will be further described below with reference to the embodiments. Disclosed below are merely preferred embodiments of this disclosure, which are not intended to limit the disclosure. It should be understood that any modifications, changes and replacements made by those skilled in the prior art without departing from the spirit of the disclosure shall fall within the scope of the disclosure defined by the appended claims.

Raw materials and equipment used in this application, unless otherwise specified, are all commercially available products. The methods used in this application are all conventional methods in the art unless otherwise specified.

There are many other implementable technical solutions, which will not be listed herein one by one. The technical solutions claimed herein are all implementable.

"Comprise" or "include" is intended to indicate that the composition (e.g., medium) or method include listed elements, but do not exclude the presence of other elements. The phrase "essentially consist of . . . " means the exclusion of other elements that are of any significance to the composition for the said purpose. Therefore, the "essentially consisting of" does not exclude other materials or steps that would not substantially affect the essential and novel features of the claimed invention. "Consist of . . . " indicates the exclusion of other trace elements and substantial methodological steps. Embodiments defined by each of these transitional terms are within the scope of this application.

According to the embodiments in this disclosure:

1. Chemical fiber false eyelashes are prepared by chemical fiber synthesis and weaving, combined with a sharpening process. Chemical fiber can be PBT, PET or a PBT-PET mixed chemical fiber material. PBT is polybutylene terephthalate, a polyester made of terephthalic acid and 1, 4-butanediol, which is non-toxic and has no irritating effect on skin. PET is a polyester resin, which belongs to a crystalline saturated polyester.

Figure 1:
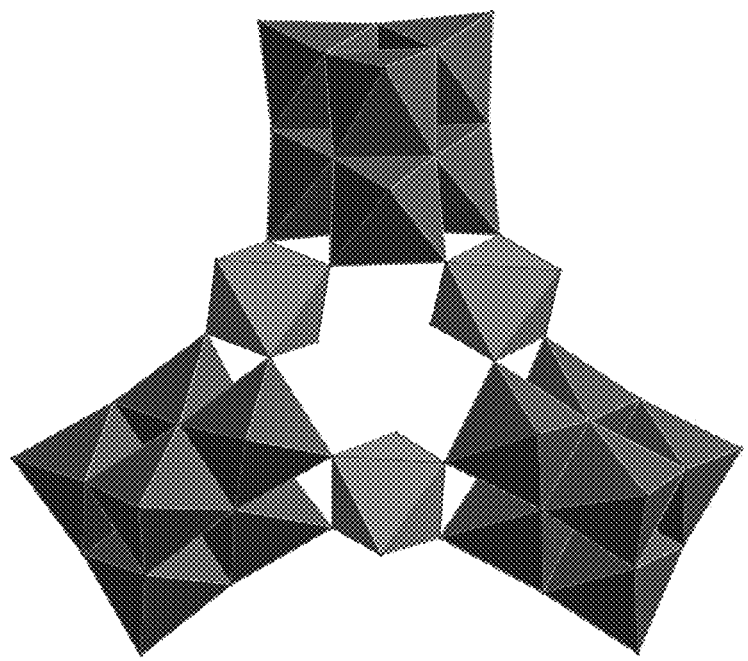
FIG. 1 is a 3D structural diagram of niobate $KNa_2[Nb_{24}O_{72}H_{21}]·38H_2O$ in accordance with an embodiment of the present disclosure.
Figure 2:
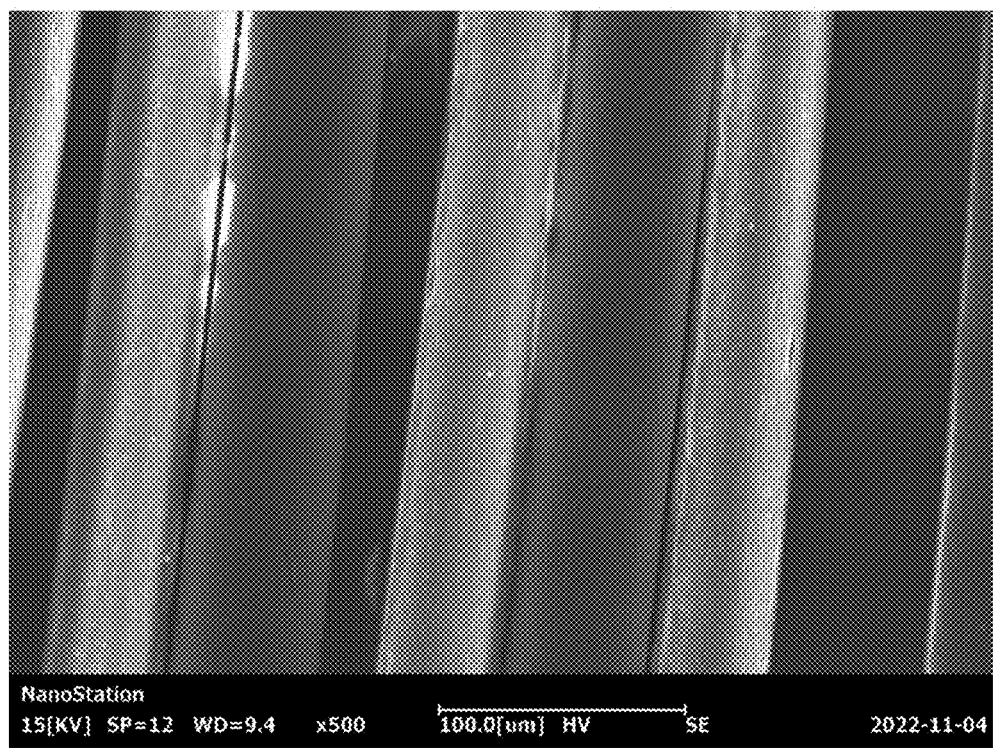
FIG. 2 is a scanning electron microscopy (SEM) image of false eyelashes without an aromatic essential oil in accordance with an embodiment of the present disclosure.
Figure 3:
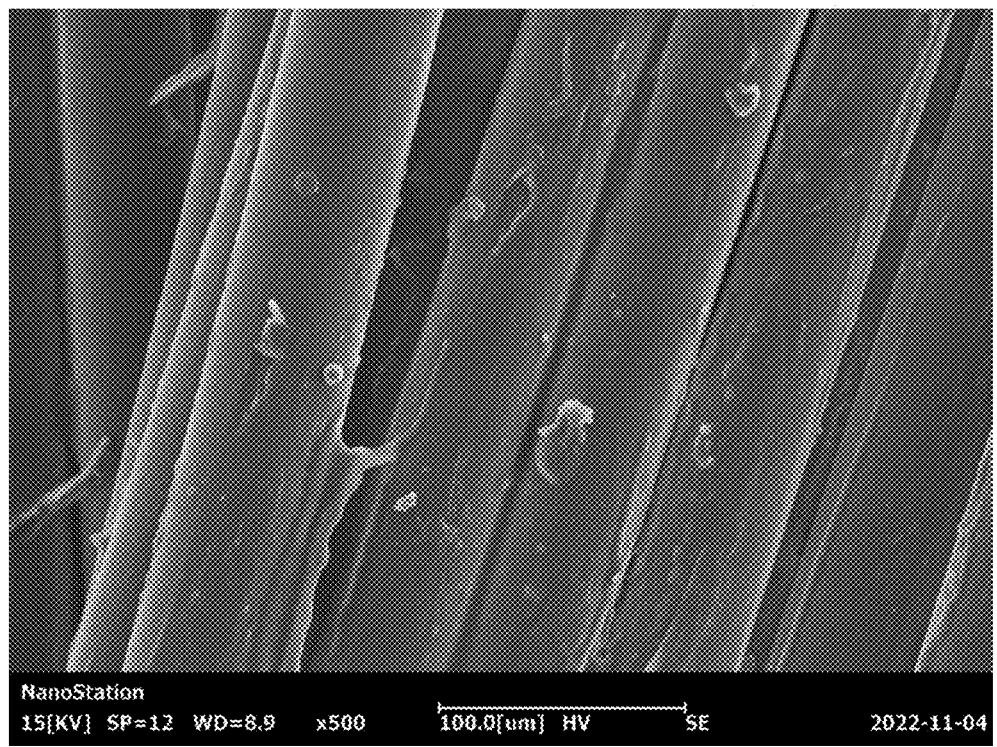
FIG. 3 is a SEM image of false eyelashes with an aromatic essential oil in accordance with Embodiment 1 of the present disclosure.
Figure 4:
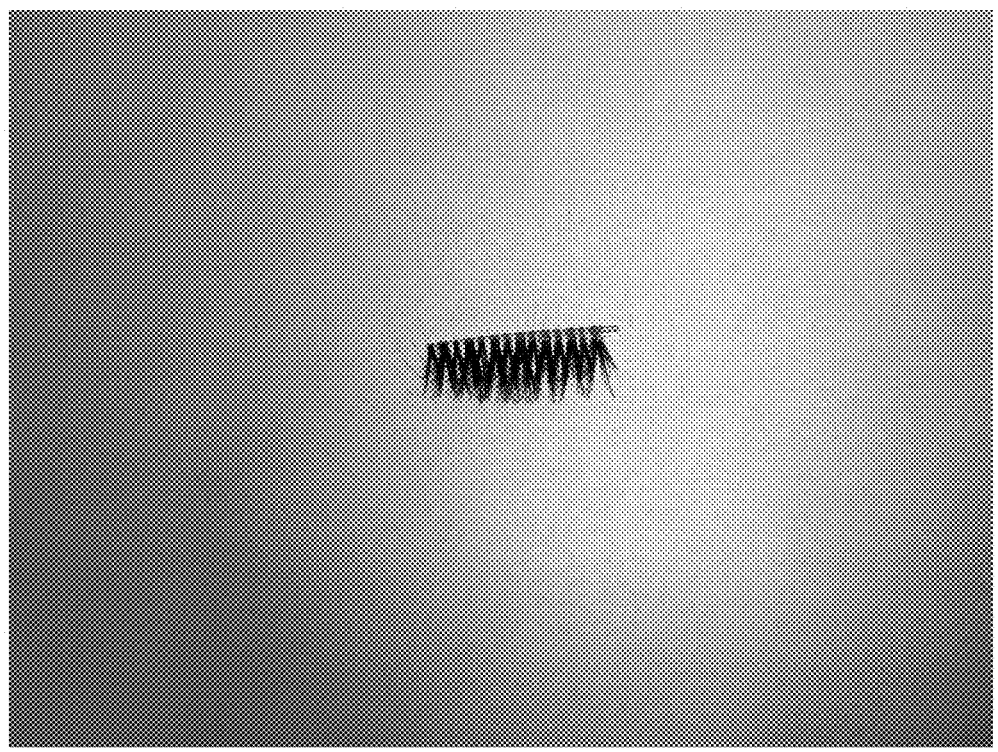
FIG. 4 is an optical photograph of false eyelashes with an aromatic essential oil in accordance with Embodiment 1 of the present disclosure.

2. A method of preparing a niobate $KNa_2[Nb_{24}O_{72}H_{21}]\cdot 38H_2O$ in accordance with an embodiment includes the following steps:

1, 4-diaminobutane was added to an aqueous solution of copper acetate monohydrate and stirred, a final purple solution was added to an aqueous solution of $K_7HNb_6O_{19}\cdot 13H_2O$ drop by drop to form a mixture. The pH of the mixture was adjusted to 10.5-11.5 with 1 mol/L sodium hydroxide. Then the mixture was heated at 50-60 C° for 3 h to concentrate, and filtered. Blue precipitates were removed two days later. A filtrate was slowly evaporated at room temperature, so as to obtain colorless crystals $KNa_2[Nb_{24}O_{72}H_{21}]\cdot 38H_2O$, whose 3D structure is illustrated in FIG. 1. An anion of the 3D structure is composed of three seven-niobium oxygen clusters connected by three niobium-oxygen octahedrons to form a triangular structure, thus forming a three-dimensional network structure through potassium ions and sodium ions, thereby forming a large number of cavities.

The niobate $KNa_2[Nb_{24}O_{72}H_{21}]\cdot 38H_2O$ prepared by other conventional methods that those skilled in the prior art may know can also be used in the core material of this disclosure.

3. An aromatic microcapsule according to an embodiment of this disclosure includes a wall material and a core material. The core material includes a niobate, and the niobate is preferably $KNa_2[Nb_{24}O_{72}H_{21}]\cdot 38H_2O$. A method of preparing the aromatic microcapsule includes preparing a wall material solution and preparing a core material solution. The core material solution includes a niobate, and the niobate is preferably $KNa_2[Nb_{24}O_{72}H_{21}]\cdot 38H_2O$. Specific steps of preparing aromatic chemical fiber false eyelashes are as follows.

Embodiment 1

Step (1) 1 g of PBT false eyelashes were washed with ethanol.

Step (2) 20 g of β-cyclodextrin was dissolved in 180 g of deionized water and stirred at room temperature for 12 h to obtain a saturated wall material solution.

Step (3) 1 g of chamomile essential oil, 1 g of a silane coupling agent and 0.5 g of $KNa_2[Nb_{24}O_{72}H_{21}]\cdot 38H_2O$ were dissolved in 50 g of ethanol and stirred at room temperature for 12 h to obtain a core material solution.

Step (4) The core material solution was slowly poured into 200 g of the wall material solution, and the mixed solution was stirred at a uniform speed.

Step (5) The mixed solution was dispersed and sheared at a speed of 3000 r/min for 20 min under a high-speed shearing machine to obtain a stable aromatic microcapsule emulsion.

Step (6) 3 g of an adhesive was added to the aromatic microcapsule emulsion prepared in step (5) to obtain a mixed finishing solution.

Step (7) The PBT false eyelashes were dried, immersed in the mixed finishing solution for 10 min, and subjected to pre-curing at 110° C. for 2 min and curing at 150° C. for 30 s to obtain aromatic PBT false eyelashes.

Embodiment 2

Step (1) 1 g of PBT false eyelashes were washed with ethanol.

Step (2) 20 g of β-cyclodextrin was dissolved in 180 g of deionized water and stirred at room temperature for 12 h to obtain a saturated wall material solution.

Step (3) 2 g of jasmine essential oil, 2 g of a silane coupling agent and 0.5 g of $KNa_2[Nb_{24}O_{72}H_{21}]\cdot 38H_2O$ were dissolved in 50 g of ethanol and stirred at room temperature for 12 h to obtain a core material solution.

Step (4) The core material solution was slowly poured into 200 g of the wall material solution, and the mixed solution was stirred at a uniform speed.

Step (5) The mixed solution was dispersed and sheared at a speed of 4000 r/min for 15 min under a high-speed shearing machine to obtain a stable aromatic microcapsule emulsion.

Step (6) 4 g of an adhesive was added to the aromatic microcapsule emulsion prepared in step (5) to obtain a mixed finishing solution.

Step (7) The PBT false eyelashes were dried, immersed in the mixed finishing solution for 15 min, and subjected to pre-curing at 100° C. for 3 min and curing at 140° C. for 60 s to obtain aromatic PBT false eyelashes.

Embodiment 3

Step (1) 1 g of PBT false eyelashes were washed with ethanol.

Step (2) 20 g of β-cyclodextrin was dissolved in 180 g of deionized water and stirred at room temperature for 12 h to obtain a saturated wall material solution.

Step (3) 3 g of ylang-ylang essential oil, 3 g of a silane coupling agent and 1 g of $KNa_2[Nb_{24}O_{72}H_{21}]\cdot 38H_2O$ were dissolved in 50 g of ethanol and stirred at room temperature for 12 h to obtain a core material solution.

Step (4) The core material solution was slowly poured into 200 g of the wall material solution, and the mixed solution was stirred at a uniform speed.

Step (5) The mixed solution was dispersed and sheared at a speed of 5000 r/min for 10 min under a high-speed shearing machine to obtain a stable aromatic microcapsule emulsion.

Step (6) 5 g of an adhesive was added to the aromatic microcapsule emulsion prepared in step (5) to obtain a mixed finishing solution.

Step (7) The PBT false eyelashes were dried, immersed in the mixed finishing solution for 20 min, and subjected to pre-curing at 90° C. for 3 min and curing at 130° C. for 60 s to obtain aromatic PBT false eyelashes.

Comparison Example 1

In this example, the aromatic false eyelashes were fabricated by a conventional method.

Step (1) 1 g of PBT false eyelashes were washed with ethanol.

Step (2) 1 g of chamomile essential oil and 1 g of a silane coupling agent were dissolved in 50 g of ethanol and stirred at room temperature for 12 h.

Step (3) The solution obtained in step (2) was slowly poured into 180 g of an aqueous solution, and the mixed solution was stirred at a uniform speed to obtain an aromatic finishing solution.

Step (4) 3 g of an adhesive was added to the aromatic finishing solution to obtain a mixed finishing solution.

Step (5) The PBT false eyelashes were dried, immersed in the mixed finishing solution for 10 min, and subjected to pre-curing at 110° C. for 2 min and curing at 150° C. for 30 s to obtain aromatic PBT false eyelashes.

Comparative Example 2

In this example, no niobate was added.

Step (1) 1 g of PBT false eyelashes were washed with ethanol.

Step (2) 20 g of β-cyclodextrin was dissolved in 180 g of deionized water and stirred at room temperature for 12 h to obtain a saturated wall material solution.

Step (3) 1 g of chamomile essential oil and 1 g of a silane coupling agent were dissolved in 50 g of ethanol and stirred at room temperature for 12 h to obtain a core material solution.

Step (4) The core material solution was slowly poured into 200 g of the wall material solution, and the mixed solution was stirred at a uniform speed.

Step (5) The mixed solution was dispersed and sheared at a speed of 3000 r/min for 20 min under a high-speed shearing machine to obtain a stable aromatic microcapsule emulsion.

Step (6) 3 g of an adhesive was added to the aromatic microcapsule emulsion prepared in step (5) to obtain a mixed finishing solution.

Step (7) The PBT false eyelashes were dried, immersed in the mixed finishing solution for 10 min, and subjected to pre-curing at 110° C. for 2 min and curing at 150° C. for 30 s to obtain aromatic PBT false eyelashes.

Comparative Example 3

In this example, the raw material ratio is not in an optimal range disclosed herein.

Step (1) 1 g of PBT false eyelashes were washed with ethanol.

Step (2) 20 g of β-cyclodextrin was dissolved in 180 g of deionized water and stirred at room temperature for 12 h to obtain a saturated wall material solution.

Step (3) 4 g of chamomile essential oil, 1 g of a silane coupling agent and 0.2 g of $KNa_2[Nb_{24}O_{72}H_{21}] \cdot 38H_2O$ were dissolved in 50 g of ethanol and stirred at room temperature for 12 h to obtain a core material solution.

Step (4) The core material solution was slowly poured into 200 g of the wall material solution, and the mixed solution was stirred at a uniform speed.

Step (5) The mixed solution was dispersed and sheared at a speed of 3000 r/min for 20 min under a high-speed shearing machine to obtain a stable aromatic microcapsule emulsion.

Step (6) 3 g of an adhesive was added to the aromatic microcapsule emulsion prepared in step (5) to obtain a mixed finishing solution.

Step (7) The PBT false eyelashes were dried, immersed in the mixed finishing solution for 10 min, and subjected to pre-curing at 110° C. for 2 min and curing at 150° C. for 30 s to obtain aromatic PBT false eyelashes.

Effect Verification

The aromatic PBT false eyelashes prepared by Embodiments 1, 2, 3 and Comparison examples 1, 2, 3 were selected as samples. 1 g of each sample was put into a round-bottom flask filled with anhydrous ethanol solution to reflux at 75° C. for 1 h. Then the sample was filtered, and an absorbance of a filtrate was measured. Then an essence concentration corresponding to the absorbance was found in the standard working curve, thereby obtaining an essence content of the aromatic PBT false eyelashes. The test results are shown in Table 1. The evaluation results of aroma retention of treated PBT false eyelashes are shown in Table 2.

TABLE 1

Test Results of Essence content of the aromatic PBT false eyelashes

| Aromatic PBT false eyelashes | Essence content $(mg \cdot g^{-1})$ |
| --- | --- |
| Embodiment 1 | 57.03 |
| Embodiment 2 | 56.85 |
| Embodiment 3 | 55.47 |
| Comparative example 1 | 24.36 |
| Comparative example 2 | 55.92 |
| Comparative example 3 | 51.73 |

TABLE 2

Evaluation results of aroma retention of treated aromatic PBT false eyelashes

| Rest time/day | Aroma retention | | | | | |
| --- | --- | --- | --- | --- | --- | --- |
| | Embodiment 1 | Embodiment 2 | Embodiment 3 | Comparative example 1 | Comparative example 2 | Comparative example 3 |
| 10 | Strong aroma | Strong aroma | Strong aroma | Obvious aroma | Strong aroma | Strong aroma |
| 30 | Strong aroma | Strong aroma | Strong aroma | Relatively obvious aroma | Obvious aroma | Obvious aroma |
| 60 | Obvious aroma | Obvious aroma | Obvious aroma | Lack of aroma | Relatively obvious aroma | Obvious aroma |

TABLE 2-continued

Evaluation results of aroma retention of treated aromatic PBT false eyelashes

| Rest time/day | Aroma retention | | | | | |
|---|---|---|---|---|---|---|
| | Embodiment 1 | Embodiment 2 | Embodiment 3 | Comparative example 1 | Comparative example 2 | Comparative example 3 |
| 90 | Relatively obvious aroma | Relatively obvious aroma | Relatively obvious aroma | No aroma | Lack of aroma | Relatively obvious aroma |
| 120 | Relatively obvious aroma | Relatively obvious aroma | Relatively obvious aroma | No aroma | Lack of aroma | Lack of aroma |

It can be seen from Table 1 and Table 2 that the aromatic chemical fiber false eyelashes in Embodiment 1-3 have excellent aromatic effect, long fragrance holding time and long service life after finishing by the microcapsule containing niobate core material. It can be obviously seen that an introduction of the niobate can more effectively protect volatile and easily denatured substances in the essential oil from an influence of the external environment, promote the slow release of the aromatic microcapsule, and further increase a service life of the aromatic chemical fiber false eyelashes, which can be used for up to 120 days.

Disclosed above are further detailed descriptions of this disclosure in combination with specific embodiments, which are not intended to limit the disclosure. For those of ordinary skill in the art to which the present disclosure belongs, any modifications, changes and replacements made without departing from the spirit of the disclosure shall fall within the scope of the disclosure defined by the appended claims.

What is claimed is:

1. A method of preparing aromatic chemical fiber false eyelashes, comprising:
    preparing an aromatic microcapsule;
    wherein the step "preparing an aromatic microcapsule" comprises:
    preparing a wall material solution; and
    preparing a core material solution;
    wherein the core material solution comprises an essential oil or a fragrance, a silane coupling agent and a niobate in a mass ratio of (1-3):(1-3):(0.5-1); and the niobate is $KNa_2[Nb_{24}O_{72}H_{21}] \cdot 38H_2O$.

2. The method of claim 1, wherein the wall material solution comprises a β-cyclodextrin and deionized water in a mass ratio of 1:9.

3. The method of claim 1, wherein a mass ratio of the core material solution to the wall material solution is 1:4.

4. The method of claim 1, wherein the essential oil is selected from the group consisting of a chamomile essential oil, a jasmine essential oil, a ylang-ylang essential oil and a combination thereof; and the fragrance is selected from the group consisting of a mint fragrance, a grape fragrance, a lavender fragrance, a tea polyphenol fragrance and a combination thereof.

5. The method of claim 1, further comprising:
    mixing the aromatic microcapsule with an adhesive to prepare a finishing solution.

6. The method of claim 1, comprising:
    step (1) washing false eyelashes with ethanol;
    step (2) dissolving β-cyclodextrin in deionized water followed by stirring at room temperature for 12 h to obtain the wall material solution in a saturated state;
    step (3) dissolving the essential oil or fragrance, the silane coupling agent and the niobate in ethanol followed by stirring at room temperature for 12 h to obtain the core material solution;
    step (4) slowly pouring the core material solution obtained in step (3) into the wall material solution followed by stirring at a uniform speed to obtain a mixed solution;
    step (5) dispersing and shearing the mixed solution with a shearing machine at a speed of 3000-5000 r/min for 10-20 min to obtain an aromatic microcapsule emulsion;
    step (6) adding 10-20 g/L of an adhesive to the aromatic microcapsule emulsion prepared in step (5) to obtain a mixed finishing solution; and
    step (7) drying the false eyelashes; and immersing the false eyelashes in the mixed finishing solution for 10-20 min followed by pre-curing and curing in sequence to obtain the aromatic chemical fiber false eyelashes.

7. An aromatic chemical fiber false eyelash, comprising:
    a false eyelash body; and
    an aromatic microcapsule attached to the false eyelash body;
    wherein the aromatic microcapsule comprises a wall material and a core material;
    the core material comprises a niobate, a silane coupling agent, and an essential oil or fragrance; wherein the niobate is $KNa_2[Nb_{24}O_{72}H_{21}] \cdot 38H_2O$; and a mass ratio of the essential oil or fragrance to the silane coupling agent to the niobate is (1-3):(1-3):(0.5-1).

8. An aromatic microcapsule, comprising:
    a wall material; and
    a core material;
    wherein the core material comprises an essential oil or fragrance, a silane coupling agent and a niobate in a mass ratio of (1-3):(1-3):(0.5-1); and the niobate is $KNa_2[Nb_{24}O_{72}H_{21}] \cdot 38H_2O$.

9. A method of preparing an aromatic microcapsule, comprising:
    preparing a wall material solution; and
    preparing a core material solution;
    wherein the core material solution comprises an essential oil or fragrance, a silane coupling agent and a niobate in a mass ratio of (1-3):(1-3):(0.5-1); and the niobate is $KNa_2[Nb_{24}O_{72}H_{21}] \cdot 38H_2O$.

* * * * *